US009522537B2

(12) United States Patent
Yuda

(10) Patent No.: US 9,522,537 B2
(45) Date of Patent: Dec. 20, 2016

(54) LIQUID DROPLET DISCHARGE APPARATUS, MASK PATTERN, AND LIQUID DROPLET DISCHARGE METHOD

(71) Applicant: Seiko Epson Corporation, Tokyo (JP)

(72) Inventor: Tomohiro Yuda, Minowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/062,702

(22) Filed: Mar. 7, 2016

(65) Prior Publication Data

US 2016/0279935 A1    Sep. 29, 2016

(30) Foreign Application Priority Data

Mar. 23, 2015    (JP) .................................. 2015-059168

(51) Int. Cl.
   B41J 2/145    (2006.01)
   B41J 2/14    (2006.01)
   G06K 15/10    (2006.01)

(52) U.S. Cl.
   CPC .............. *B41J 2/1433* (2013.01); *B41J 2/145* (2013.01); *G06K 15/107* (2013.01)

(58) Field of Classification Search
   CPC ............ B41J 2/1433; B41J 2/145; B41J 2/21; B41J 29/393; B41J 2/155; B41J 2/2132; B41J 2/2146; B41J 2/2054; G06K 15/107
   See application file for complete search history.

(56) References Cited

U.S. PATENT DOCUMENTS

2006/0044574 A1*   3/2006  Ide ..................... G06K 15/107
                                                              358/1.8

FOREIGN PATENT DOCUMENTS

JP          11-245384 A        9/1999

* cited by examiner

*Primary Examiner* — Thinh H Nguyen
(74) *Attorney, Agent, or Firm* — Harness, Dickey & Pierce, P.L.C.

(57) ABSTRACT

The liquid droplet discharge apparatus (ink jet printer) includes a head having a nozzle row in which nozzles capable of discharging liquid droplets onto paper as a medium are aligned, and a carriage unit as a movement portion which moves the head relatively to the paper, the ink jet printer discharging the liquid droplets onto the paper through the nozzles by causing the head to perform main scanning a plurality of number of times by the carriage unit. In the ink jet printer, when a region from a nozzle at one end to a first nozzle located at a position away from the nozzle at the one end by a first predetermined distance is set to a first region, a region from a nozzle at the other end at an opposite side to the one end to a second nozzle located at a position away from the nozzle at the other end by a second predetermined distance is set to a second region, and a region between the first region and the second region is set to a third region on the nozzle row, a thinned-out portion is present on each of raster lines formed by nozzles in the third region.

7 Claims, 10 Drawing Sheets

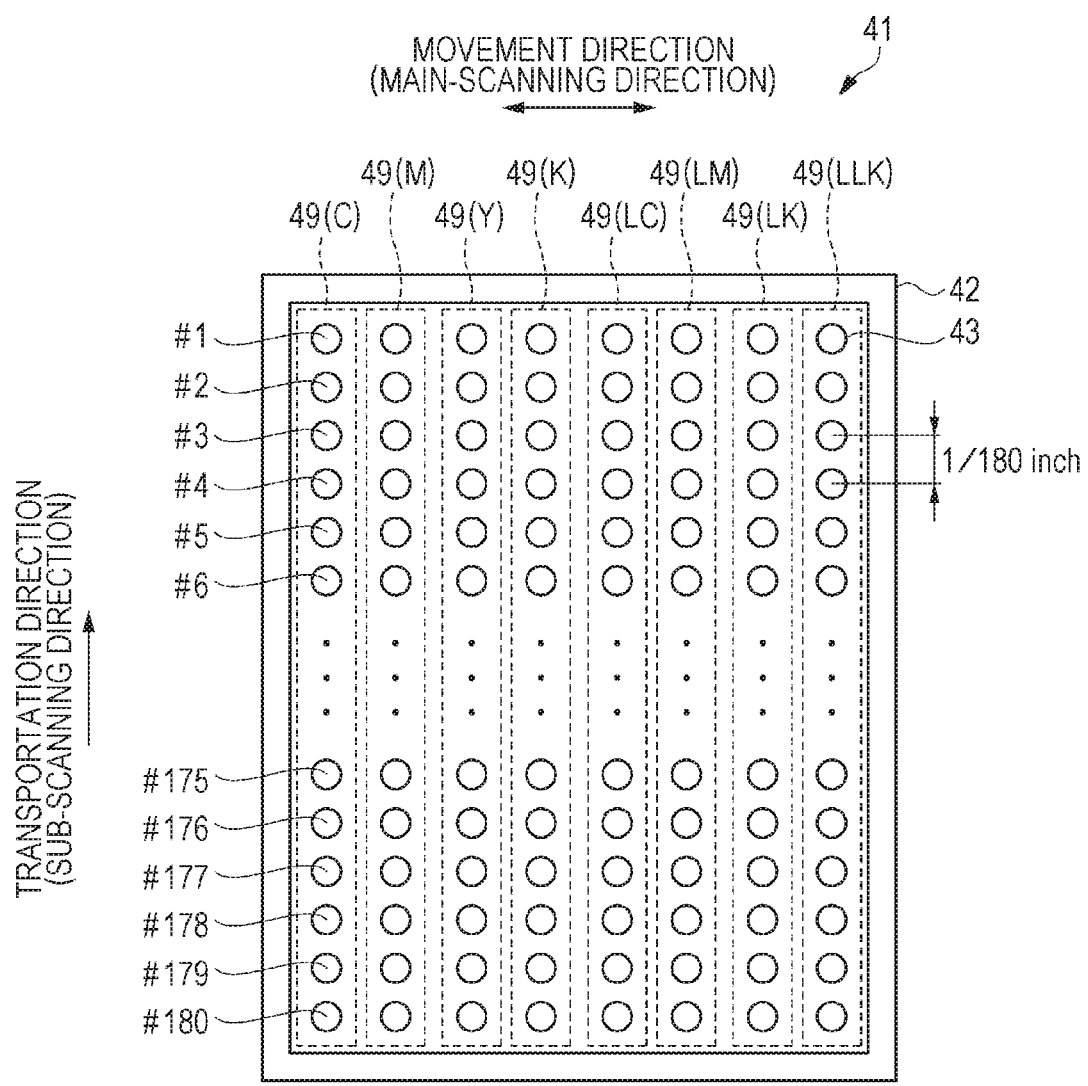

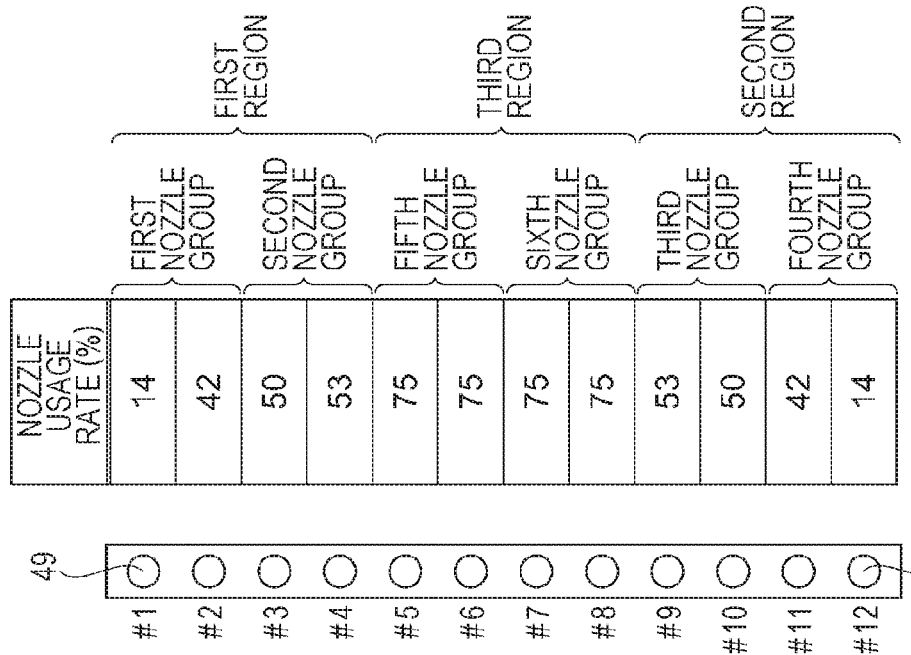
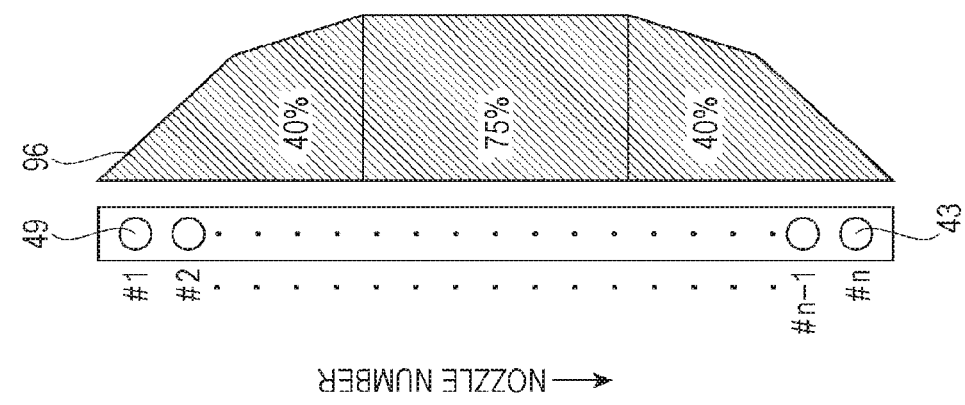

FIG. 8

LIQUID DROPLET DISCHARGE APPARATUS, MASK PATTERN, AND LIQUID DROPLET DISCHARGE METHOD

BACKGROUND

1. Technical Field

The present invention relates to a liquid droplet discharge apparatus, a mask pattern, and a liquid droplet discharge method.

2. Related Art

As an example of an existing liquid droplet discharge apparatus, an ink jet printer that records (prints) an image by discharging ink droplets onto media of various types such as paper, and a film or the like and forming a plurality of dots on the media has been known. For example, the ink jet printer alternately repeats main scanning and sub scanning. In the main scanning, a head on which a plurality of nozzles are formed is caused to discharge ink droplets through the nozzles while being moved in a main-scanning direction relatively to the medium so as to form dot rows (raster lines) aligned in the main-scanning direction of the medium. In the sub scanning, the medium is moved (transported) in a sub-scanning direction intersecting with the main-scanning direction. With the main scanning and the sub scanning, dots are aligned on the medium in the main-scanning direction and the sub-scanning direction densely, so that an image is formed on the medium.

For example, JP-A-11-245384 discloses a recording apparatus in which an image region that is formed by main scanning of a head and an image region that is formed by subsequent main scanning overlap with each other on a boundary portion and a state where 100% printing is performed shifts to a state where no printing is performed toward nozzles on end portions of the head on the overlapped boundary portion. The recording apparatus can avoid drastic deterioration in image quality even when the boundary portion varies with a transportation error of sub scanning.

However, the liquid droplet discharge apparatus (recording apparatus) as disclosed in JP-A-11-245384 forms an image by triple main-scanning and discharges liquid droplets (ink droplets) through the nozzles in a state where the liquid droplets are discharged on image regions with 100%-printing other than the boundary portions. When the main scanning is performed in a state where the liquid droplets of 100% are discharged, the liquid droplets that are simultaneously discharged through all the nozzles along the sub-scanning direction become obstacles and turbulence is generated at the rear side of the liquid droplets. The turbulence causes band-like density unevenness (hereinafter, image defect with the density unevenness is referred to as "wind ripple"), that is, density is relatively higher than peripherals on the medium due to satellites having small masses in some cases. This arises a problem that the image quality is lowered.

SUMMARY

An advantage of some aspects of the invention has been made to solve at least a part of the issues mentioned above and can be realized in the following modes or application examples.

Application Example 1

A liquid droplet discharge apparatus according to an application example includes a head having a nozzle row in which nozzles capable of discharging liquid droplets onto a medium are aligned, and a movement portion which moves the head relatively to the medium, the liquid droplet discharge apparatus discharging the liquid droplets onto the medium through the nozzles by causing the head to perform main scanning a plurality of number of times by the movement portion. In the liquid droplet discharge apparatus, when a region from a nozzle at one end to a first nozzle located at a position away from the nozzle at the one end by a first predetermined distance is set to a first region, a region from a nozzle at the other end at an opposite side to the one end to a second nozzle located at a position away from the nozzle at the other end by a second predetermined distance is set to a second region, and a region, between the first region and the second region is set to a third region on the nozzle row, a thinned-out portion is present on each of raster lines formed by nozzles in the third region.

According to this application example, in the liquid droplet discharge apparatus, the thinned-out portion is present on each of the raster lines formed by the nozzles in the third region. To be specific, when an image is formed by triple main-scanning while the first regions and the second regions are overlapped with each other, the existing liquid droplet discharge apparatus discharges the liquid droplets forming dots of 100% by single scanning through the nozzles in the third region. In contrast, the liquid droplet discharge apparatus in this application example performs so-called thinning-out printing in which the liquid droplets to be discharged through the nozzles in the third region are thinned out. With this, the liquid droplets are not simultaneously discharged through all the nozzles in the third region, which are aligned along the sub-scanning direction. Therefore, obstacles with the liquid droplets, which cause generation of turbulence, are eliminated, and wind ripple that occurs due to the obstacles is therefore made difficult to occur. Accordingly, the liquid droplet discharge apparatus improving image quality can be provided.

Application Example 2

In the liquid droplet discharge apparatus according to the above application example, it is preferable that the thinned-out portion be present on each of raster lines formed by nozzles in the first region and the second region.

According to this application example, the thinning-out printing is performed for the liquid droplets that are discharged through the nozzles in the first region and the second region in the same manner as that for the liquid droplets that are discharged through the nozzles in the third region. With this, dots are uniformly thinned out on an overall image. Therefore, it can be made difficult to visually recognize shade unevenness due to the thinning-out of the dots that are formed by the nozzles in the third region.

Application Example 3

In the liquid droplet discharge apparatus according to the above application example, it is preferable that an average nozzle usage rate of the nozzles in the third region be equal to or higher than 70% and equal to or lower than 90%.

According to this application example, the average nozzle usage rate of the nozzles in the third region is set to be equal to or lower than 90%. This realizes an effect that generation of the turbulence and occurrence of the wind ripple due to the turbulence can be suppressed. Further, if the average nozzle usage rate of the nozzles is set to be lower than 70%, the dots that are thinned out on the raster lines are increased, resulting in lowering of color density (hue) of the image.

Application Example 4

In the liquid droplet discharge apparatus according to the above application example, it is preferable that nozzle usage rates of nozzles at both the ends of the nozzle row be equal to or lower than 1%.

According to this application example, the nozzle usage rates of the nozzles at both the ends of the nozzle row are set to be equal to or lower than 1%. Therefore, even when a transportation error of the sub scanning is generated, shade unevenness that is caused by the transportation error can be made difficult to be visually recognized.

Application Example 5

In the liquid droplet discharge apparatus according to the above application example, it is preferable that when the first region is classified into a first nozzle group and a second nozzle group, the second region is classified into a third nozzle group and a fourth nozzle group, and the third region is classified into a fifth nozzle group and a sixth nozzle group, nozzles be provided in the head in order of the first nozzle group, the second nozzle group, the fifth nozzle group, the sixth nozzle group, the third nozzle group, and the fourth nozzle group, and a total of average nozzle usage rates of the second nozzle group and the third nozzle group be equal to a total of average nozzle usage rates of the first nozzle group and the sixth nozzle group.

According to this application example, the liquid droplet discharge apparatus forms the same raster lines with the liquid droplets that are discharged through the nozzles of the second nozzle group and the third nozzle group and forms the same raster lines with the liquid droplets that are discharged through the nozzles of the first nozzle group and the sixth nozzle group. In the liquid droplet discharge apparatus in this application example, the total of the average nozzle usage rates of the second nozzle group and the third nozzle group and the total of the average nozzle usage rates of the first nozzle group and the sixth nozzle group are equal to each other. Therefore, the shade unevenness can be made difficult to be visually recognized.

Application Example 6

A mask pattern according to another application example specifies for each nozzle whether a discharge instruction is made valid or invalid to a liquid droplet discharge apparatus that includes a head having a nozzle row in which nozzles capable of discharging liquid droplets onto a medium are aligned, and a movement portion which moves the head relatively to the medium, and discharges the liquid droplets onto the medium through the nozzles by causing the head to perform main scanning a plurality of number of times by the movement portion. When a region from a nozzle at one end to a first nozzle located at a position away from the nozzle at the one end by a first predetermined distance is set to a first region, a region from a nozzle at the other end at an opposite side to the one end to a second nozzle located at a position away from the nozzle at the other end by a second predetermined distance is set to a second region, and a region between the first region and the second region is set to a third region on the nozzle row, the mask pattern specifies for each nozzle whether the discharge instruction is made valid or invalid such that a thinned-out portion is present on each of raster lines which are formed by nozzles in the third region.

According to this application example, the mask pattern of the liquid droplet discharge apparatus can instruct each of the nozzles in the third region to discharge the liquid droplets such that the thinned-out portion is present on each of the raster lines which are formed by the nozzles in the third region. For example, when an image is formed by triple main-scanning while the first regions and the second regions are overlapped with each other, the existing mask pattern causes the liquid droplets forming the dots of 100% to be discharged through the nozzles in the third region by single main scanning. In contrast, the mask pattern in this application example specifies for each nozzle whether the discharge instruction is made valid or invalid such that so-called thinning-out printing in which the liquid droplets to be discharged through the nozzles in the third region are thinned out is performed. With this, the liquid droplets are not simultaneously discharged through all the nozzles in the third region, which are aligned along the sub-scanning direction. Therefore, the obstacles with the liquid droplets, which cause generation of the turbulence, are eliminated, and the wind ripple that occurs due to the obstacles is therefore made difficult to occur. Accordingly, the mask pattern improving image quality can be provided.

Application Example 7

A liquid droplet discharge method for a liquid droplet discharge apparatus according to still another application example includes discharging liquid droplets by a head having a nozzle row in which nozzles capable of discharging the liquid droplets onto a medium are aligned, and moving the head relatively to the medium, the liquid droplet discharge method discharging the liquid droplets onto the medium through the nozzles by causing the head to perform main scanning a plurality of number of times by the moving. In the liquid droplet discharge method, when a region from a nozzle at one end to a first nozzle located at a position away from the nozzle at the one end by a first predetermined distance is set to a first region, a region from a nozzle at the other end at an opposite side to the one end to a second nozzle located at a position away from the nozzle at the other end by a second predetermined distance is set to a second region, and a region between the first region and the second region is set to a third region on the nozzle row, the liquid droplets are discharged such that a thinned-out portion is present on each of raster lines which are formed by nozzles in the third region.

According to this application example, with the liquid droplet discharge method for the liquid droplet discharge apparatus, the thinned-out portion is present on each of the raster lines formed by the nozzles in the third region. To be specific, when an image is formed by triple main-scanning while the first regions and the second regions are overlapped with each other, the existing liquid droplet discharge method causes the liquid droplets forming the dots of 100% by single scanning to be discharged through the nozzles in the third region. In contrast, the liquid droplet discharge method in this application example performs so-called thinning-out printing in which the liquid droplets to be discharged through the nozzles in the third region are thinned out. With this, the liquid droplets are not simultaneously discharged through all the nozzles in the third region, which are aligned along the sub-scanning direction. Therefore, the obstacles with the liquid droplets, which cause generation of the turbulence, are eliminated, and the wind ripple that occurs due to the obstacles is therefore made difficult to occur. Accordingly, the liquid droplet discharge method improving image quality can be provided.

BRIEF DESCRIPTION OF THE DRAWINGS

The invention will be described with reference to the accompanying drawings, wherein like numbers reference like elements.

FIG. 2 is a descriptive view for explaining an example of alignment of nozzles.

FIG. 7A is a view illustrating a mask pattern according to a second embodiment and FIG. 7B is a view illustrating nozzle usage rates in the second embodiment.

FIG. 8 is a view for explaining raster lines that are formed in the second embodiment.

DESCRIPTION OF EXEMPLARY EMBODIMENTS

Hereinafter, embodiments of the present invention will be described with reference to the accompanying drawings. In the following respective drawings, individual layers and members are illustrated in scales different from actual scales in order to make the individual layers and members have recognizable sizes.

Figure 1A:
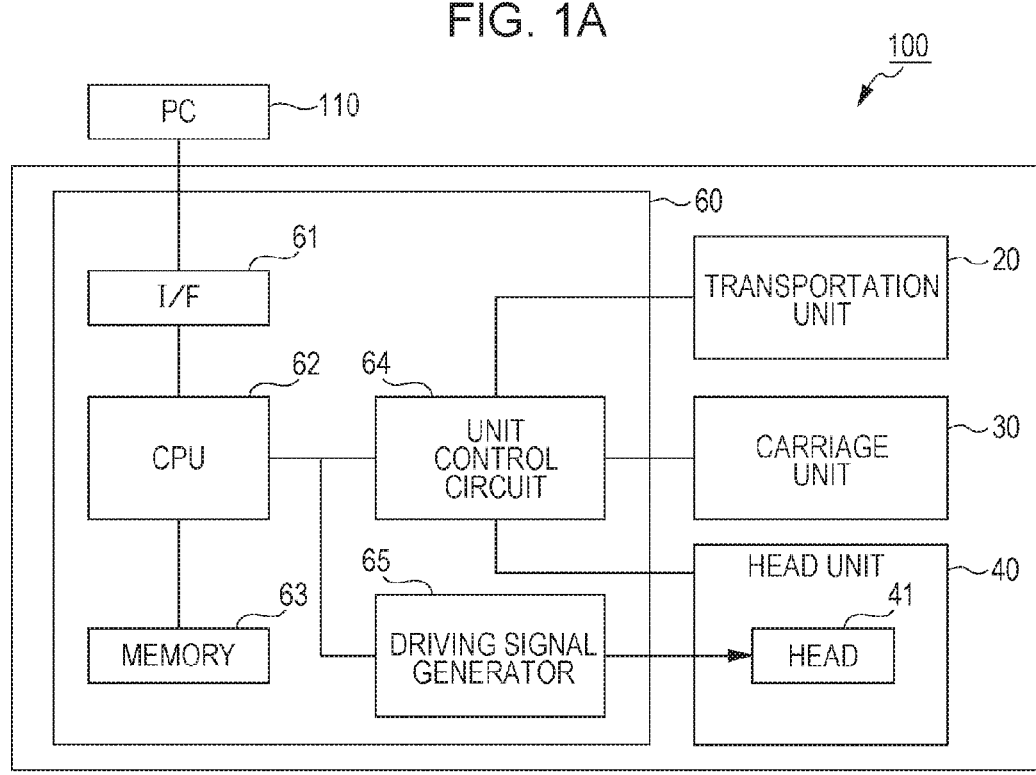
FIGS. 1A and 1B are a block diagram and a perspective view illustrating the overall configuration of an ink jet printer as a liquid droplet discharge apparatus according to a first embodiment.
Figure 1B:
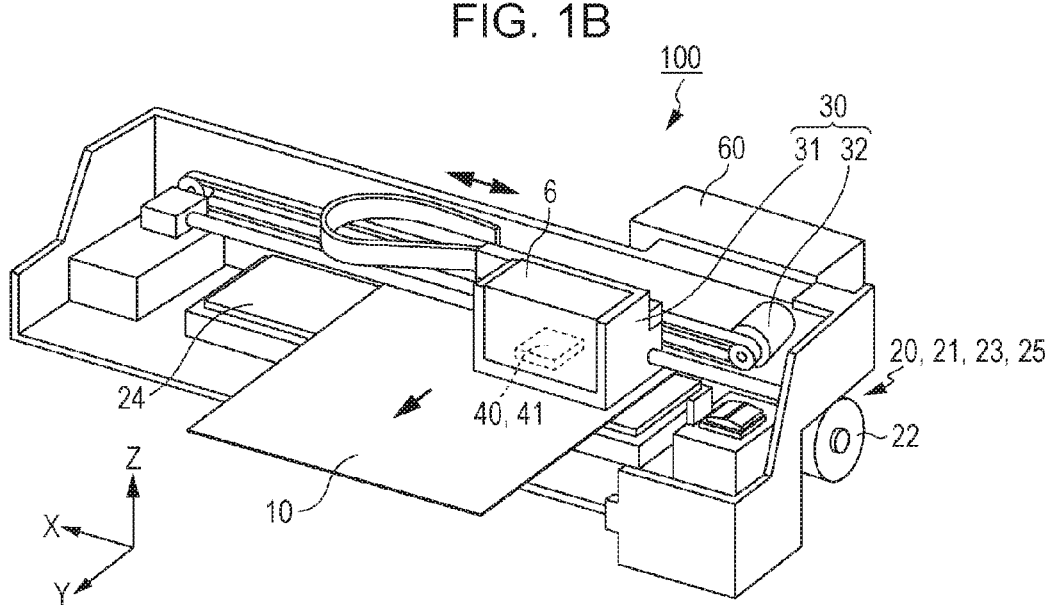
Figure 3:
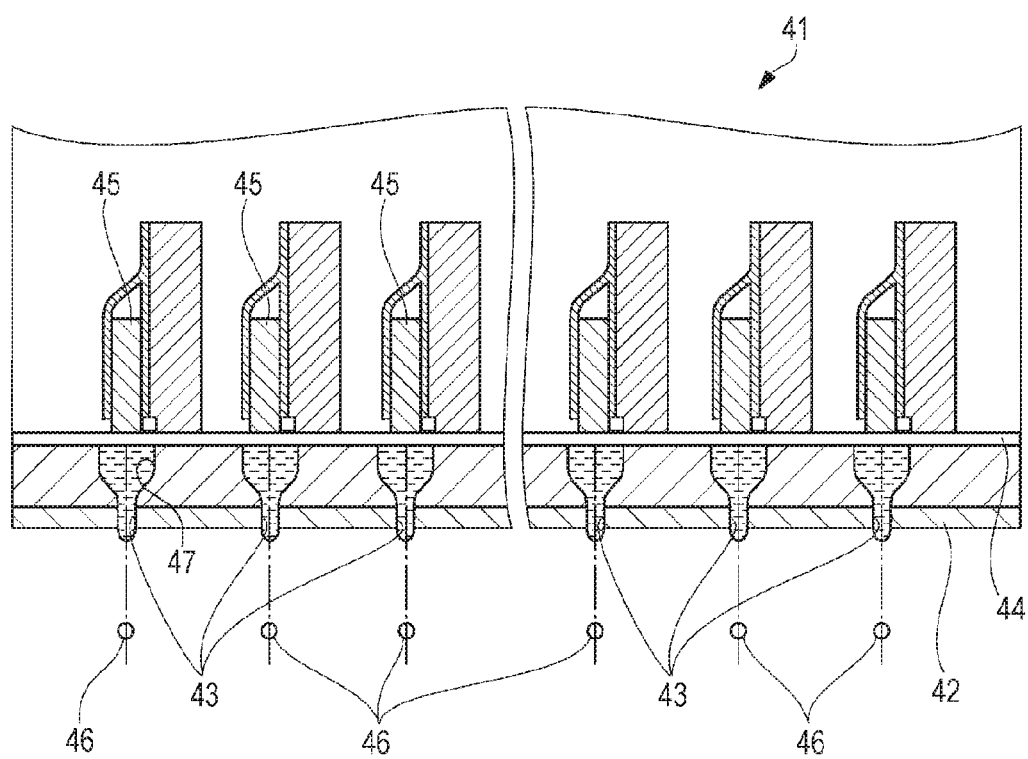
FIG. 3 is a cross-sectional view illustrating the internal configuration of a head.

In FIG. 1B and FIG. 3, an X axis, a Y axis, and a Z axis are illustrated as three axes orthogonal to one another for the convenience of explanation. Point sides of arrows as illustrated in FIG. 1B and FIG. 3 are set to "+sides" in axial directions and base sides of the arrows are set to "−sides" in the axial directions. Further, hereinafter, the direction parallel with the X axis is referred to as an "X-axis direction" or a "main-scanning direction", the direction parallel with the Y axis is referred to as a "Y-axis direction" or a "sub-scanning direction", and the direction parallel with the Z axis is referred to as a "Z-axis direction".

First Embodiment

Liquid Droplet Discharge Apparatus

FIG. 1A is a block diagram illustrating the overall configuration of an ink jet printer 100 as a liquid droplet discharge apparatus according to a first embodiment and FIG. 1B is a perspective view thereof.

First, the basic configuration of the ink jet printer 100 is described.

Basic Configuration of Ink Jet Printer

The ink jet printer 100 includes a transportation unit 20, a carriage unit 30 as a movement portion, a head unit 40, and a controller 60. The ink jet printer 100 that has received print data (image formation data) from a computer 110 as an external apparatus controls individual units (the transportation unit 20, the carriage unit 30, and the head unit 40) by the controller 60. The controller 60 controls the individual units based on the print data received from the computer 110 and prints (forms) an image onto paper 10 as a medium.

The carriage unit 30 as the movement portion is a unit for causing a head 41 to scan (move) in a predetermined movement direction (the X-axis direction as illustrated in FIG. 1B, hereinafter, referred to as the main-scanning direction) and moves the head 41 relatively to the paper 10 as the medium. The carriage unit 30 includes a carriage 31, a carriage motor 32, and the like. The carriage 31 holds the head 41 and an ink cartridge 6. The head 41 includes nozzle rows 49 (see FIG. 2) in which nozzles 43 (see FIG. 2 and FIG. 3) capable of discharging ink as liquid in a state of liquid droplets onto the paper 10 are aligned. The ink cartridge 6 stores therein the ink that is discharged from the head 41 and is attached to the carriage 31 detachably. The carriage 31 can reciprocate in the main-scanning direction and is driven by the carriage motor 32. With this, the head 41 is moved in the main-scanning direction (±X-axis direction).

The transportation unit 20 is a unit for transporting (moving) the paper 10 in a sub-scanning direction (the Y-axis direction as illustrated in FIG. 1B) intersecting with the main-scanning direction. The transportation unit 20 includes a paper feeding roller 21, a transportation motor 22, a transportation roller 23, a platen 24, a paper discharge roller 25, and the like. The paper feeding roller 21 is a roller for feeding the paper 10 inserted into a paper insertion port (not illustrated) to an inner portion of the ink jet printer 100. The transportation roller 23 is a roller for transporting the paper 10 fed by the paper feeding roller 21 to a region in which printing can be performed and is driven by the transportation motor 22. The platen 24 supports the paper 10 on which the printing is being performed. The paper discharge roller 25 is a roller for discharging the paper 10 to the outside of the printer and is provided at the downstream side relative to the region in which the printing can be performed in the sub-scanning direction.

The head unit 40 is a unit for discharging the ink as the liquid droplets onto the paper 10. The head unit 40 includes the head 41 having the plurality of nozzles 43 (see FIG. 2). The head 41 is mounted on the carriage 31. Therefore, when the carriage 31 moves in the main-scanning direction, the head 41 also moves in the main-scanning direction. The head 41 discharges the ink while moving in the main-scanning direction so as to form dot rows (raster lines) along the main-scanning direction on the paper 10.

The controller 60 is a unit for controlling the ink jet printer 100. The controller 60 includes an interface unit 61, a central processing unit (CPU) 62, a memory 63, a unit control circuit 64, and a driving signal generator 65. The interface unit 61 controls to transmit and receive data between the computer 110 as the external apparatus and the ink jet printer 100. The CPU 62 is an arithmetic processing device for controlling the printer overall. The memory 63 ensures a region for storing programs of the CPU 62, a work area, and the like, and has a storage element such as a random access memory (RAM) and an electrically erasable programmable read-only memory (EEPROM).

The CPU 62 controls the individual units (the transportation unit 20, the carriage unit 30, and the head unit 40) through the unit control circuit 64 in accordance with the programs stored in the memory 63. The driving signal generator 65 generates a driving signal for driving piezoelectric elements 45 (see FIG. 3) making the ink be discharged through the nozzles 43.

When printing is performed, the controller 60 controls to perform a "movement process" of moving the head 41 in the main-scanning direction relatively to the paper 10 while performing a "discharge process" of discharging the ink onto the paper 10 by the head 41 having the nozzle rows 49 in which the nozzles capable of discharging the ink are aligned. With this, the dot rows (raster lines) formed along the main-scanning direction are printed on the paper 10. Then, the controller 60 controls the transportation unit 20 as a transportation unit to transport the paper 10 in the sub-scanning direction. The operation is referred to as a "transportation process". The controller 60 controls to repeat the discharge process, and the movement process, and the transportation process, so that the raster lines are aligned in the sub-scanning direction of the paper 10 and an image is formed on the paper 10. In the first embodiment, the head 41 is made to perform main scanning a plurality of number of times by the movement process so as to discharge the ink onto the paper 10 through the nozzles. To be specific, one raster line is formed by transporting the paper 10 in the sub-scanning direction by an amount smaller than the width of the head 41 in the sub-scanning direction and performing the discharge process and the movement process a plurality of number of times. This processing is referred to as n-pass (n: integer) printing and an $n^{th}$ pass is expressed as "pass n".

Configuration of Head

FIG. 2 is a descriptive view for explaining an example of alignment of the nozzles 43 in the head 41. FIG. 3 is a cross-sectional view illustrating the internal configuration of the head 41.

As illustrated in FIG. 2, eight nozzle rows 49 are provided in the head 41 and a nozzle plate 42 in which discharge ports of the nozzles 43 are opened is provided on the lower surface of the head 41 (surface at -Z-axis side in FIG. 1). Inks of dark cyan (C), dark magenta (M), yellow (Y), dark black (K), light cyan (LC), light magenta (LM), light black (LK), and ultralight black (LLK) are discharged through the eight nozzle rows 49.

180 nozzles 43 (nozzle number #1 to nozzle number #180) aligned in the sub-scanning direction are provided on each nozzle row 49 at a nozzle pitch of 180 dots per inch (dpi). In FIG. 2, a smaller nozzle number #n (n=1 to 180) is assigned to the nozzle 43 closer to the most-downstream side in the sub-scanning direction. It should be noted that the number of nozzle rows 49 and the types of the inks are examples and are not limited thereto.

As illustrated in FIG. 3, the head 41 includes the nozzle plate 42 and the nozzles 43 are formed in the nozzle plate 42. Cavities 47 communicating with the nozzles 43 are formed at positions opposing the nozzles 43 at the upper side (+Z-axis side) of the nozzle plate 42. The inks that are stored in the ink cartridge 6 are supplied to the cavities 47 of the head 41.

A vibration plate 44 and the piezoelectric elements 45 are arranged at the upper side (+Z-axis side) of the cavities 47. The vibration plate 44 vibrate in the up-down direction (±Z-axis direction) so as to increase and decrease volumes in the cavities 47. The piezoelectric elements 45 expand and contract in the up-down direction so as to cause the vibration plate 44 to vibrate. The piezoelectric elements 45 expand and contract in the up-down direction so as to cause the vibration plate 44 to vibrate and the vibration plate 44 increases and decreases the volumes in the cavities 47, so that the cavities 47 are pressurized. With this, pressures in the cavities 47 vary and the inks supplied into the cavities 47 are discharged through the nozzles 43.

When the head 41 receives a driving signal for controlling driving of the piezoelectric elements 45, which has been generated by the driving signal generator 65 (see FIG. 1), the piezoelectric elements 45 expand and the vibration plate 44 decreases the volumes in the cavities 47. As a result, the inks by amounts of the decreased volumes are discharged as liquid droplets 46 through the nozzles 43 of the head 41. Although a pressure unit using the longitudinal vibration-type piezoelectric elements 45 is used in the first embodiment, the pressure unit is not limited thereto. For example, deflection deformation-type piezoelectric elements formed by laminating and forming lower electrodes, piezoelectric layers, and upper electrodes may be used. Further, so-called static actuators or the like for generating static electricity between the vibration plate and electrodes and deforming the vibration plate with the static electricity so as to cause the liquid droplets to be discharged through the nozzles may be used as a pressure generation unit. Moreover, a head having the configuration in which bubbles are generated in the nozzles using a heat generator and the ink is discharged as the liquid droplets with the bubbles may be employed.

Image Formation Method According to Existing Technique

An image formation method according to an existing technique will be described before an image formation method in the first embodiment will be described. FIG. 9A is a view illustrating a mask pattern according to the existing technique and FIG. 9B is a view illustrating nozzle usage rates in the existing technique.

FIG. 9A is a view illustrating the nozzle row 49 and a mask pattern 92 formed by patterning nozzle usage rates of the nozzles 43 of the nozzle numbers #1 to #n, which are formed in the nozzle row 49. Although the description has been made while the number of nozzles formed in the head 41 is n=180, in the following description, one nozzle row 49 formed by n=12 nozzles (a nozzle #1 to a nozzle #12) is assumed to be provided in the head 41 and printing is assumed to be performed with one color ink only in order to simplify the explanation.

Figure 9B:
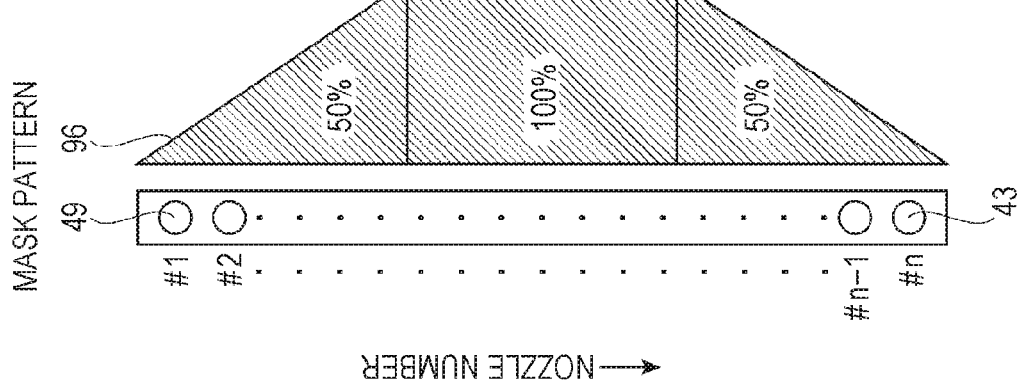
FIG. 9A is a view illustrating a mask pattern according to an existing technique and FIG. 9B is a view illustrating nozzle usage rates in the existing technique.
Figure 9A:
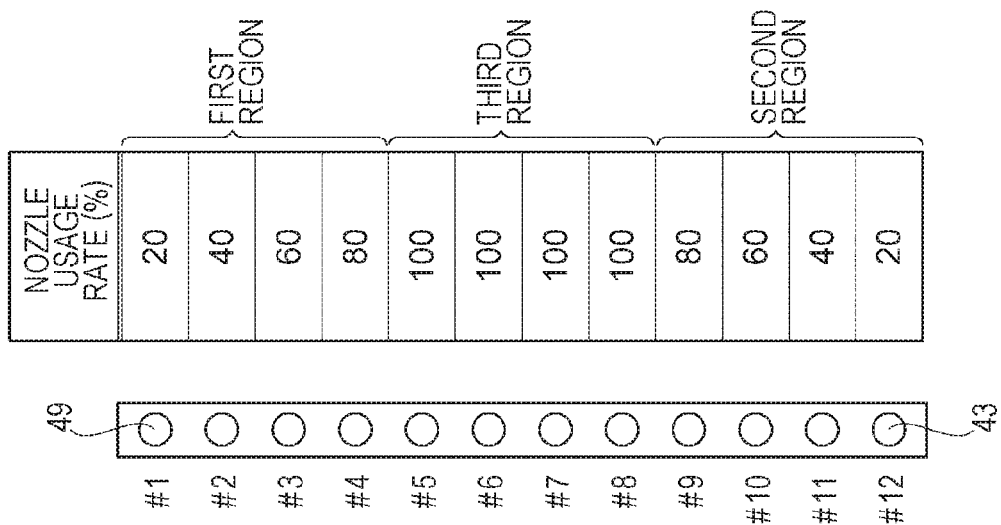

The nozzle usage rates as illustrated in FIGS. 9A and 9B indicate rates of the dots that are formed by one pass. For example, when a printing method in which printing is performed on pixels of odd rows and even rows by different passes is employed, the maximum number of dots capable of being formed by one pass is half the number of pixels forming raster lines and is set to the maximum nozzle usage rate of 100% with one pass. In other words, when printing for one pass is performed at the nozzle usage rate of 100%, the dots are formed on all the pixels located on the even rows or the odd rows. Therefore, in order to form the dots on all the pixels of one raster line, passes by which the total nozzle usage rate is 200% are required. The mask pattern 92 forms a trapezoidal shape and includes three regions that are divided by lines intersecting with an upper base at both the ends and a lower base at positions opposing both the ends of the upper base. In the respective regions, average nozzle usage rates of the regions are noted.

FIG. 9B illustrates the nozzle usage rates that are assigned to the respective nozzles based on the mask pattern as illustrated in FIG. 9A when the number of nozzles is n=12. The nozzle row 49 is divided into three regions of a first region, a second region, and a third region and they correspond to the three regions of the above-described mask pattern 92 respectively. A nozzle (nozzle #1) at one end to a first nozzle (nozzle #4) located at a position away from the nozzle (nozzle #1) at the one end by a first predetermined distance are assigned to the first region. A nozzle (nozzle #12) at the other end at the side opposite to the one end to a second nozzle (nozzle #9) located at a position away from the nozzle (nozzle #12) at the other end by a second predetermined distance are assigned to the second region. Nozzles (nozzle #5 to nozzle #8) located between the first region and the second region are assigned to the third region. The average nozzle usage rates of the nozzles belonging to the first region and the second region are 50% and the nozzle usage rates thereof become 100% by making the first region and the second region overlap with each other by two passes. The nozzles 43 belonging to the first region and the second region are referred to as POL nozzles. The average nozzle usage rate of the nozzles 43 belonging to the third region is 100% and the nozzles 43 belonging to the third region are referred to as normal nozzles.

Figure 10:
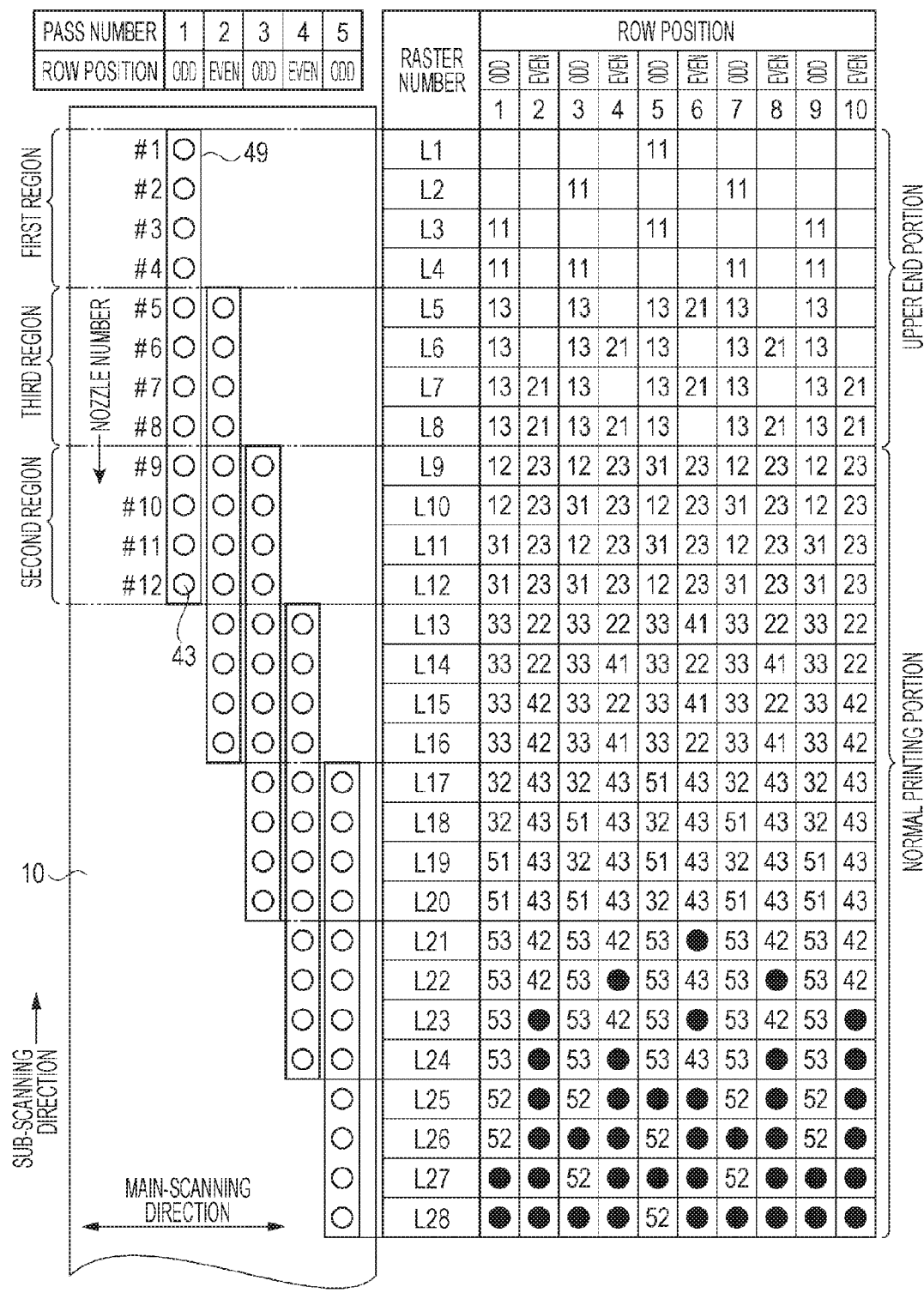
FIG. 10 is a view for explaining raster lines that are formed in the existing technique.

FIG. 10 is a view for explaining raster lines that are formed in the existing technique. A left view of FIG. 10 illustrates relative positions of the paper 10 and the nozzle row 49 in the sub-scanning direction when a pass (the discharge process and the movement process) of moving the head 41 in the main-scanning direction while causing the head 41 to discharge the ink through the nozzles (the nozzle #1 to the nozzle #12) and transportation (the transportation process) of feeding the paper 10 in the sub-scanning direction by a constant amount (in the first embodiment, an amount for four nozzles) by the transportation unit 20 are repeated five times from the upper end of the paper 10. That is to say, although FIG. 10 illustrates a state where the nozzle row 49 is moved relative to the paper 10, it is sufficient that a positional relation between the nozzle row 49 and the paper 10 is changed relatively. Therefore, the nozzle row 49 may be moved, the paper 10 may be moved, or both of the nozzle row 49 and the paper 10 may be moved. In this description, the paper 10 is transported in the sub-scanning direction as an example. The nozzle row 49 on the respective passes is illustrated so as to be slanted in the main-scanning direction such that positional illustrations of the nozzle row 49 on the respective passes do not overlap with one another. Therefore, the positional relation between the paper 10 and the nozzles (head 41) in the main-scanning direction does not make sense. Although the regions of the nozzle row and the numbers of the respective nozzles are noted for only the nozzle row 49 of the pass 1 for the convenience of simple illustration, those are applied to the nozzle row of other passes in the same manner.

Next, dot formation positions in the respective passes are described. A right view of FIG. 10 illustrates pixel positions of the dots that are formed by the respective passes with raster (raster line) numbers and row positions. Odd-numbered passes (pass number: 1, 3, . . . ) form the dots at odd-numbered pixel positions noted with "odd" for the row position. Even-numbered passes (pass number: 2, 4, . . . ) form the dots at even-numbered pixel positions noted with "even" for the row position. Two-digit figures as described at each pixel position indicate the pass number in which the dot has been formed and the region of the nozzle through which the liquid droplet has been discharged. For example, the two-digit figures "23" indicate that the dot has been formed by the nozzle belonging to the third region in the second pass. It should be noted that pixel positions marked with "●" indicate dots formed in a pass 6 or a pass following the pass 6.

The respective raster lines are formed by the normal nozzles in the third region, the POL nozzles in the first region, and the POL nozzles in the second region.

For example, the dots at odd row positions (on the odd rows) for the raster numbers L9 to L12 are formed by the nozzles #9 to #12 belonging to the second region in the pass 1 and the nozzles #1 to #4 belonging to the first region in the pass 3 in an overlapping manner. To be specific, the dots on the odd rows for the raster number L9 are formed by the nozzle #9 in the pass 1 and the nozzle #1 in the pass 3. In the same manner, the dots for the raster number L10 are formed by the nozzle #10 and the nozzle #2, the dots for the raster number L11 are formed by the nozzle #11 and the nozzle #3, and the dots for the raster number L12 are formed by the nozzle #12 and the nozzle #4. The nozzle usage rate of the nozzles combined for each raster number are 100%, and the dots are therefore formed at all the pixel positions (100%) of the odd rows by the pass 1 and the pass 3. On the other hand, the dots at the even row positions (on the even rows) for the raster numbers L9 to L12 are formed by the nozzles #5 to #8 belonging to the third region in the pass 2. The nozzles #5 to #8 are normal nozzles with the nozzle usage rates of 100%, and the dots are therefore formed at all the pixel positions (100%) of the even rows by the pass 2.

The image formation method will be described.

First, the paper 10 is transported to a predetermined position in the transportation process. Then, the dots are formed on the odd rows for the raster numbers L1 to L12 in the discharge process and the movement process of the pass 1. Subsequently, the paper 10 is transported in the sub-scanning direction by a distance corresponding to four nozzles in the transportation process. After that, the dots are formed on the odd rows for the raster numbers L5 to L16 in the discharge process and the movement process of the pass 2. Subsequently, the paper 10 is transported in the sub-scanning direction by a distance corresponding to four nozzles in the transportation process. After that, the dots are formed on the odd rows for the raster numbers L9 to L20 in the discharge process and the movement process of the pass 3. Subsequently, the transportation process, and the discharge process and the movement process are repeated in this order. With this, a normal printing portion is completed on the raster lines of the raster number L9 and the following numbers. It should be noted that the raster numbers L1 to L8 correspond to an upper end portion, and upper end processing is separately performed on the upper end portion by minutely feeding the paper 10.

As described above, the liquid droplets are successively discharged through the nozzles #5 to #8 belonging to the third region all the time on each pass. When the head moves in the main-scanning direction in this state, the liquid droplets become obstacles and turbulence generates at the opposite side to the movement direction of the head in some cases. The turbulence causes occurrence of wind ripple on the paper 10 with satellites having small masses, which have been separated from the liquid droplets, in some cases.

Image Formation Method in First Embodiment

Figure 4B:
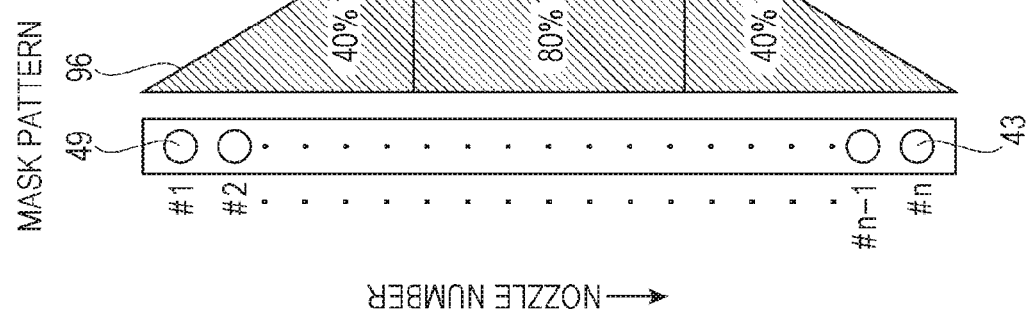
FIG. 4A is a view illustrating a mask pattern and FIG. 4B is a view illustrating nozzle usage rates.
Figure 4A:
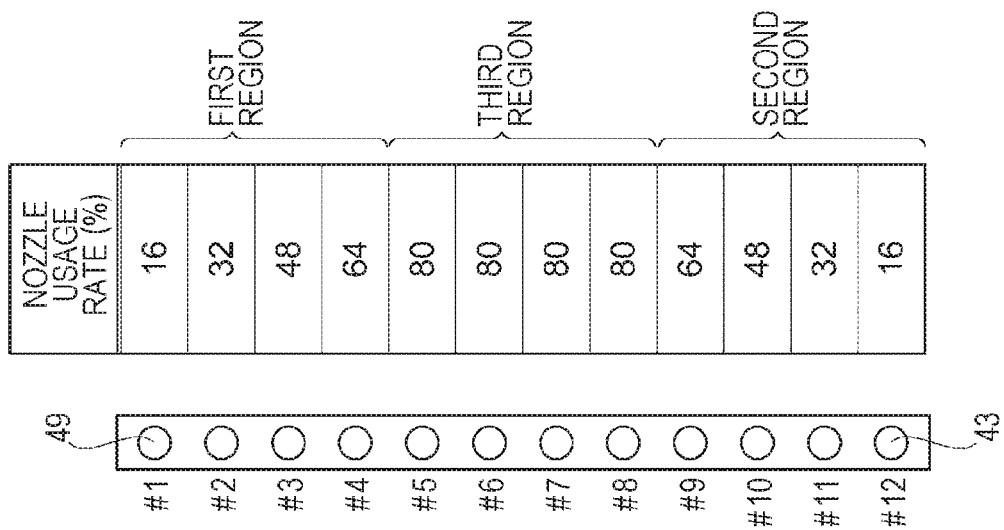

FIG. 4A is a view illustrating a mask pattern according to the first embodiment and FIG. 4B is a view illustrating nozzle usage rates in the first embodiment. FIG. 4A is a view illustrating the nozzle row 49 and a mask pattern 94 formed by patterning nozzle usage rates of the nozzles 43 of nozzle numbers #1 to #n, which are formed in the nozzle row 49. Although description has been made while the number of nozzles formed in the head 41 is n=180, in the following description, one nozzle row 49 formed by n=12 nozzles (a nozzle #1 to a nozzle #12) is assumed to be provided in the head 41 and printing is assumed to be performed with one color ink only in order to simplify the explanation in the same manner as the existing example as illustrated in FIGS. 9A and 9B.

The nozzle usage rates as illustrated in FIGS. 4A and 4B indicate rates of the dots that are formed by one pass. The embodiment employs a printing method in which printing is performed on pixels of odd rows and even rows by different passes. The maximum number of dots capable of being formed by one pass is half the total number of pixels forming the raster lines and is set to the maximum nozzle usage rate of 100% with one pass. In other words, when printing for one pass is performed at the nozzle usage rate of 100%, the dots are formed on all the pixels located on the even rows or the odd rows. Therefore, in order to form the dots on all the pixels of one raster line, passes by which the total nozzle usage rate is 200% are required. The mask pattern 94 forms a trapezoidal shape and includes three regions that are divided by lines intersecting with an upper base at both the ends and a lower base at positions opposing both the ends of the upper base. In the respective regions, average nozzle usage rates of the regions are noted.

FIG. 4B illustrates the nozzle usage rates that are assigned to the respective nozzles based on the mask pattern as illustrated in FIG. 4A when the number of nozzles is n=12. The nozzle row 49 is divided into three regions of a first region, a second region, and a third region and they correspond to the three regions of the above-described mask pattern 94. A nozzle (nozzle #1) at one end to a first nozzle (nozzle #4) located at a position away from the nozzle (nozzle #1) at the one end by a first predetermined distance are assigned to the first region. A nozzle (nozzle #12) at the other end at the side opposite to the one end to a second nozzle (nozzle #9) located at a position away from the nozzle (nozzle #12) at the other end by a second predetermined distance are assigned to the second region. Nozzles (nozzle #5 to nozzle #8) located between the first region and the second region are assigned to the third region. The average nozzle usage rates of the nozzles belonging to the first region and the second region are 40% and the nozzle usage rates become 80% by making the first region and the second region overlap with each other by two passes. The nozzles 43 belonging to the first region and the second region are referred to as POL nozzles. The average nozzle usage rate of the nozzles 43 belonging to the third region is 80% and the nozzles 43 belonging to the third region are referred to as normal nozzles.

Figure 5:
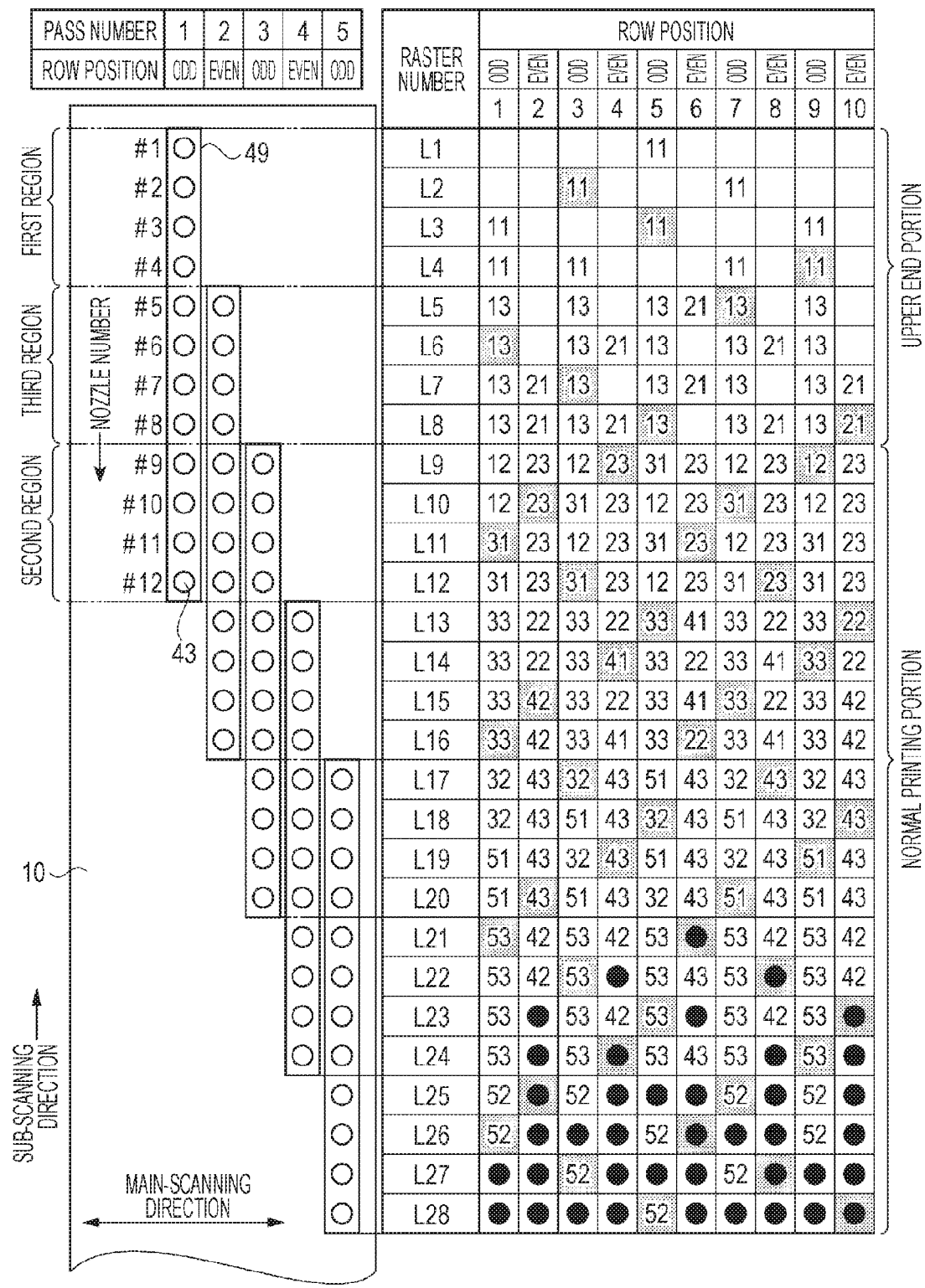
FIG. 5 is a view for explaining raster lines that are formed in the first embodiment.

FIG. 5 is a view for explaining raster lines that are formed in the first embodiment. The left view of FIG. 5 illustrates relative positions of the paper 10 and the nozzle row 49 in the sub-scanning direction when a pass (the discharge process and the movement process) of moving the head 41 in the main-scanning direction while causing the head 41 to discharge the ink through the nozzles (the nozzle #1 to the nozzle #12) and transportation (the transportation process) of feeding the paper 10 in the sub-scanning direction by a constant amount (in the first embodiment, an amount for four nozzles) by the transportation unit 20 are repeated five times from the upper end of the paper 10. That is to say, although FIG. 5 illustrates a state where the nozzle row 49 is moved relative to the paper 10, it is sufficient that a positional relation between the nozzle row 49 and the paper 10 is changed relatively. Therefore, the nozzle row 49 may be moved, the paper 10 may be moved, or both of the nozzle row 49 and the paper 10 may be moved. In the first embodiment, the paper 10 is transported in the sub-scanning direction, as an example. The nozzle row 49 on the respective passes is illustrated so as to be slantedly moved in the main-scanning direction such that positional illustrations of the nozzle row 49 on the respective passes do not overlap with one another. Therefore, the positional relation between the paper 10 and the nozzles (head 41) in the main-scanning direction does not make sense. Although the regions of the nozzle row and the numbers of the respective nozzles are noted for only the nozzle row 49 of the pass 1 for the convenience of simple illustration, those are applied to the nozzle row of other passes in the same manner.

Next, dot formation positions in the respective passes are described. The right view of FIG. 5 illustrates pixel positions of the dots that are formed by the respective passes with raster (raster line) numbers and row positions. Odd-numbered passes (pass number: 1, 3, . . . ) form the dots at odd-numbered pixel positions noted with "odd" for the row position. Even-numbered passes (pass number: 2, 4, . . . ) form the dots at even-numbered pixel positions noted with "even" for the row position. Two-digit figures as described at each pixel position indicate the pass number and the region of the nozzle through which the liquid droplet has been discharged when all the dots are formed in the normal printing portion with the existing technique as illustrated in FIGS. 9A and 9B and FIG. 10. For example, the two-digit figures "23" indicate that the dot is formed by the nozzle belonging to the third region in the second pass. Hatched pixels indicate positions of dots that are thinned out (not formed) unlike the case of formation of all the dots when printing is performed using the mask pattern and the nozzle usage rates in the first embodiment. It should be noted that pixel positions marked with "●" indicate dots formed in a pass 6 or a pass following the pass 6.

The respective raster lines are formed by the normal nozzles in the third region, the POL nozzles in the first region, and the POL nozzles in the second region.

First, dots that are formed at even row positions (on the even rows) are described. For example, the dots on the even rows for the raster numbers L9 to L12 are formed by the nozzles #5 to #8 belonging to the third region in the pass 2. The nozzles #5 to #8 are the normal nozzles with the nozzle usage rates of 80%. Therefore, a thinned-out portion is present on each of the raster lines on the even rows formed by the nozzles #5 to #8 in the third region. To be specific, the dot at a row position 4 of an even number is thinned out for the raster number L9, the dot at a row position 2 of an even number is thinned out for the raster number L10, the dot at a row position 6 of an even number is thinned out for the raster number L11, and the dot at a row position 8 of an even number is thinned out for the raster number L12, and 20% dots of the pixels at the even row positions in the direction of each raster number (main-scanning direction) are thinned out.

In the same manner, as for the direction of the row position (sub-scanning direction), the dot for the raster number L10 among the raster numbers L9 to L12 is thinned out at the row position 2 of the even number, for example. In this description, the dot that is thinned out is approximately one dot because the number of nozzles belonging to the third region is set to 4 nozzles. However, when the number of nozzles is n=180, for example, the number of nozzles belonging to the third region is 60 nozzles and 12 dots corresponding 20% of the pixels that are formed by the nozzles belonging to the third nozzle are thinned out in the direction of the row position. With this, the liquid droplets are not simultaneously discharged through all the nozzles belonging to the third region, which are aligned along the sub-scanning direction. Spaces corresponding to the thinned-out liquid droplets serve as pathways of airflow.

Therefore, the obstacles with the liquid droplets, which cause generation of the turbulence at the opposite side to the direction in which the head 41 moves in the main-scanning direction, are eliminated, and the wind ripple is therefore made difficult to occur.

Next, dots that are formed at odd row positions (on the odd rows) are described. For example, the dots on the odd rows for the raster numbers L9 to L12 are formed by the nozzles #9 to #12 belonging to the second region in the pass 1 and the nozzles #1 to #4 belonging to the first region in the pass 3 in an overlapping manner. Both of the average nozzle usage rates of the nozzles 43 belonging to the first region and second region are 40% and the nozzle usage rates of the nozzles 43 combined by the pass 1 and the pass 2 are 80%. For example, the dots on the odd rows for the raster number L9 are formed by the nozzle #9 in the pass 1 and the nozzle #1 in the pass 3 and the total nozzle usage rate of the nozzle usage rate 64% of the nozzle #9 and the nozzle usage rate 16% of the nozzle #1 is 80%. The total nozzle usage rates of the nozzles 43 combined for other raster numbers are 80% in the same manner. Therefore, a thinned-out portion is present on each of the raster lines formed by the nozzles in the first region and the second region and 20% dots of the pixels at the odd row positions in the direction of each raster number (main-scanning direction) are thinned out. With this, dots are uniformly thinned out on an overall image. Therefore, it can be made difficult to visually recognize shade unevenness due to the thinning-out of the dots that are formed by the nozzles nozzle 43 in the third region.

It is preferable that the nozzle usage rates of nozzles at both the ends of the nozzle row 49 be equal to or lower than 1%. In the description, the number of nozzles that are formed on the nozzle row 49 is n=12. Therefore, the nozzle usage rates of the nozzles #1 and #12 as the nozzles at both the ends are 16% based on the mask pattern 94 as illustrated in FIGS. 4A and 4B. However, when the number of nozzles is n=180, for example, the nozzle usage rates of the nozzles at both the ends can be set to be equal to or lower than 1% close to 0%. With this, even when a transportation error is generated in the movement of the paper 10 in the sub-scanning, shade unevenness that is caused by the transportation error can be made difficult to be visually recognized.

Figure 6:
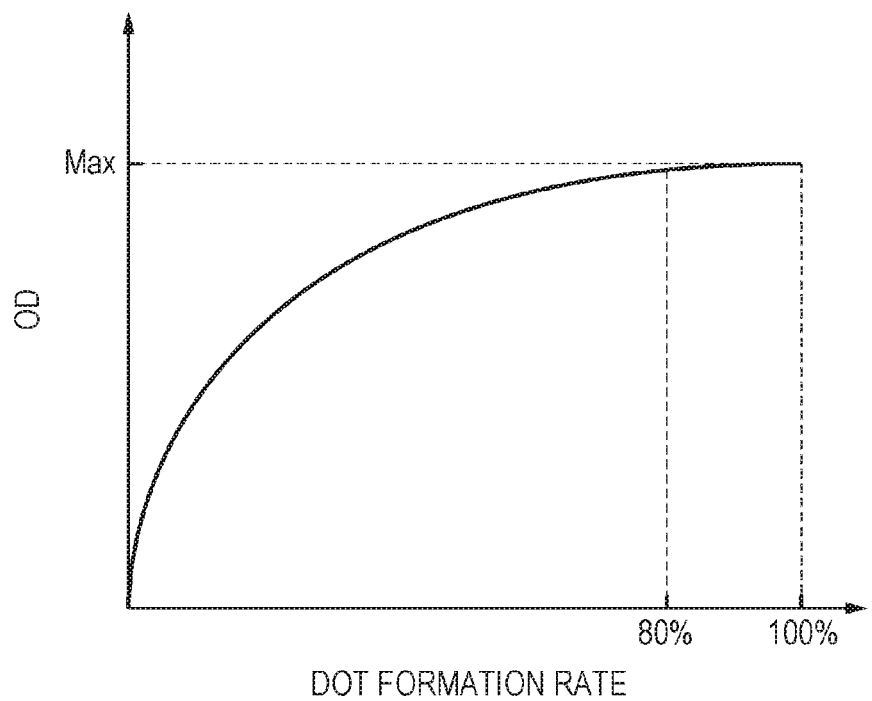
FIG. 6 is a graph illustrating a relation between a dot formation rate and an optical density.

Then, an optical density of an image will be described. FIG. 6 is a graph illustrating a relation between a dot formation rate and an optical density. A transverse axis of FIG. 6 indicates the dot formation rate expressing the number of dots that are formed on an image by a rate and a longitudinal axis of FIG. 6 indicates the optical density (OD). As illustrated in FIG. 6, it is assumed that an OD value when 100% dots are formed on the pixels on which the image is formed is Max. In this case, even when the number of dots is approximately 80%, the dots are formed so as to protrude from the pixels and the optical density does not lower substantially. Accordingly, it is preferable that the average nozzle usage rate of the nozzles 43 in the third region be equal to or higher than 70% and equal to or lower than 90%. The average nozzle usage rate of the nozzles 43 in the third region is set to be equal to or higher than 70% and equal to or lower than 90% so as to realize an effect that generation of the turbulence and occurrence of the wind ripple due to the turbulence are suppressed while keeping the optical density (hue).

Next, an image formation method in the first embodiment will be described.

First, the paper 10 is transported to a predetermined position in the transportation process. Then, the dots are formed on the odd rows for the raster numbers L1 to L12 in the discharge process and the movement process of the pass 1. The liquid droplets 46 are discharged through the nozzles 43 at positions at which the dots are formed actually in accordance with the mask pattern 94 specifying for each nozzle whether a discharge instruction is made valid or invalid. In this case, whether the discharge instruction is made valid or invalid is specified for each nozzle such that the thinned-out portion is present on each of the raster lines (of the raster number L5 to L8) which are formed by the nozzles #5 to #8 in the third region.

Subsequently, the paper 10 is transported in the sub-scanning direction by a distance corresponding to four nozzles in the transportation process. After that, the dots are formed on the even rows for the raster numbers L5 to L16 in the discharge process and the movement process of the pass 2. The liquid droplets 46 are discharged through the nozzles 43 at positions at which the dots are formed actually in accordance with the mask pattern 94 specifying for each nozzle whether the discharge instruction is made valid or invalid. In this case, whether the discharge instruction is made valid or invalid is specified for each nozzle such that the thinned-out portion is present on each of the raster lines (of the raster numbers L9 to L12) which are formed by the nozzles #5 to #8 in the third region.

Subsequently, the paper 10 is transported in the sub-scanning direction by a distance corresponding to four nozzles in the transportation process. After that, the dots are formed on the odd rows for the raster numbers L9 to L20 in the discharge process and the movement process of the pass 3. The liquid droplets 46 are discharged through the nozzles 43 at positions at which the dots are formed actually in accordance with the mask pattern 94 specifying for each nozzle whether the discharge instruction is made valid or invalid. In this case, whether the discharge instruction is made valid or invalid is specified for each nozzle such that the thinned-out portion is present on each of the raster lines (of the raster numbers L13 to L16) which are formed by the nozzles #5 to #8 in the third region. Subsequently, the transportation process, and the discharge process and the movement process are repeated in this order. With this, a normal printing portion is completed on the raster lines of the raster number L9 and the following numbers. It should be noted that the raster numbers L1 to L8 correspond to an upper end portion, and the upper end processing is separately performed on the upper end portion by minutely feeding the paper 10.

The mask pattern as described in the first embodiment is merely an example. The shape of the mask pattern and the specific nozzle usage rates of the individual nozzles are not limited as long as the mask pattern is a pattern capable of forming the raster lines with the thinned-out portions through the normal nozzles that are not overlapped by other passes.

Further, although the raster line is formed by 3-pass printing in the first embodiment, the invention is not limited thereto. Alternatively, the raster line may be formed using a mask pattern for forming the raster line by 2-pass printing or a mask pattern for forming the raster line by equal to or more than 3-pass printing.

The liquid droplet discharge apparatus (ink jet printer 100) in the first embodiment can realize the following effects as described above.

The ink jet printer 100 discharges the liquid droplets 46 such that the thinned-out portion is present on each of the raster lines which are formed by the nozzles 43 belonging to the third region. Therefore, the liquid droplets 46 are not simultaneously discharged through all the nozzles belonging to the third region, which are aligned along the sub-scanning direction. With this, spaces corresponding to the thinned-out liquid droplets serve as pathways of airflow. Therefore, the obstacles with the liquid droplets 46, which cause generation of the turbulence at the opposite side to the direction in which the head 41 moves in the main-scanning direction, are eliminated, and the wind ripple is therefore made difficult to occur. Accordingly, the ink jet printer 100 as the liquid droplet discharge apparatus improving image quality can be provided.

Further, the ink jet printer 100 discharges the liquid droplets 46 such that the thinned-out portion is present on each of the raster lines which are formed by the nozzles in the first region and the second region in the same manner. Therefore, it can be made difficult to visually recognize shade unevenness due to the thinning-out of the dots that are formed by the nozzles 43 in the third region.

Further, the nozzle usage rates of the nozzles 49 at both the ends are set to be equal to or lower than 1% based on the mask pattern 94. With this, even when the transportation error is generated in the movement of the paper 10 in the sub-scanning direction, shade unevenness that is caused by the transportation error can be made difficult to be visually recognized.

In addition, the average nozzle usage rate of the nozzles 43 in the third region is set to be equal to or higher than 70% and equal to or lower than 90%. With this, generation of the turbulence and occurrence of the wind ripple due to the turbulence can be suppressed while keeping the optical density (hue).

In the liquid droplet discharge method for the ink jet printer 100, the transportation process of transporting the paper 10, and the discharge process and the movement process of discharging the liquid droplets 46 onto the paper 10 are repeated. In the method, the liquid droplets 46 are discharged such that the thinned-out portion is present on each of the raster lines which are formed by the nozzles in the third region. With this, spaces corresponding to the thinned-out liquid droplets serve as pathways of airflow. Therefore, the obstacles with the liquid droplets 46, which cause generation of the turbulence at the opposite side to the direction in which the head 41 moves in the main-scanning direction, are eliminated, and the wind ripple is therefore made difficult to occur. Accordingly, the liquid droplet discharge method for the ink jet printer 100 as the liquid droplet discharge apparatus improving image quality can be provided.

Further, the mask pattern 94 of the ink jet printer 100 specifies for each nozzle whether the discharge instruction is made valid or invalid such that the thinned-out portion is present on each of the raster lines which are formed by nozzles in the third region. Therefore, the thinned-out portion is present on each of the raster lines which are formed by the nozzles in the third region. With this, the obstacles with the liquid droplets 46, which cause generation of the turbulence at the opposite side to the direction in which the head 41 moves in the main-scanning direction, are eliminated, and the wind ripple is therefore made difficult to occur. Accordingly, the mask pattern 94 of the ink jet printer 100 as the liquid droplet discharge apparatus improving image quality can be provided.

Second Embodiment

An ink jet printer as a liquid droplet discharge apparatus according to a second embodiment will be described. The liquid droplet discharge apparatus in the second embodiment is different from the first embodiment in the number of passes by which an image is formed.

Figure 8:
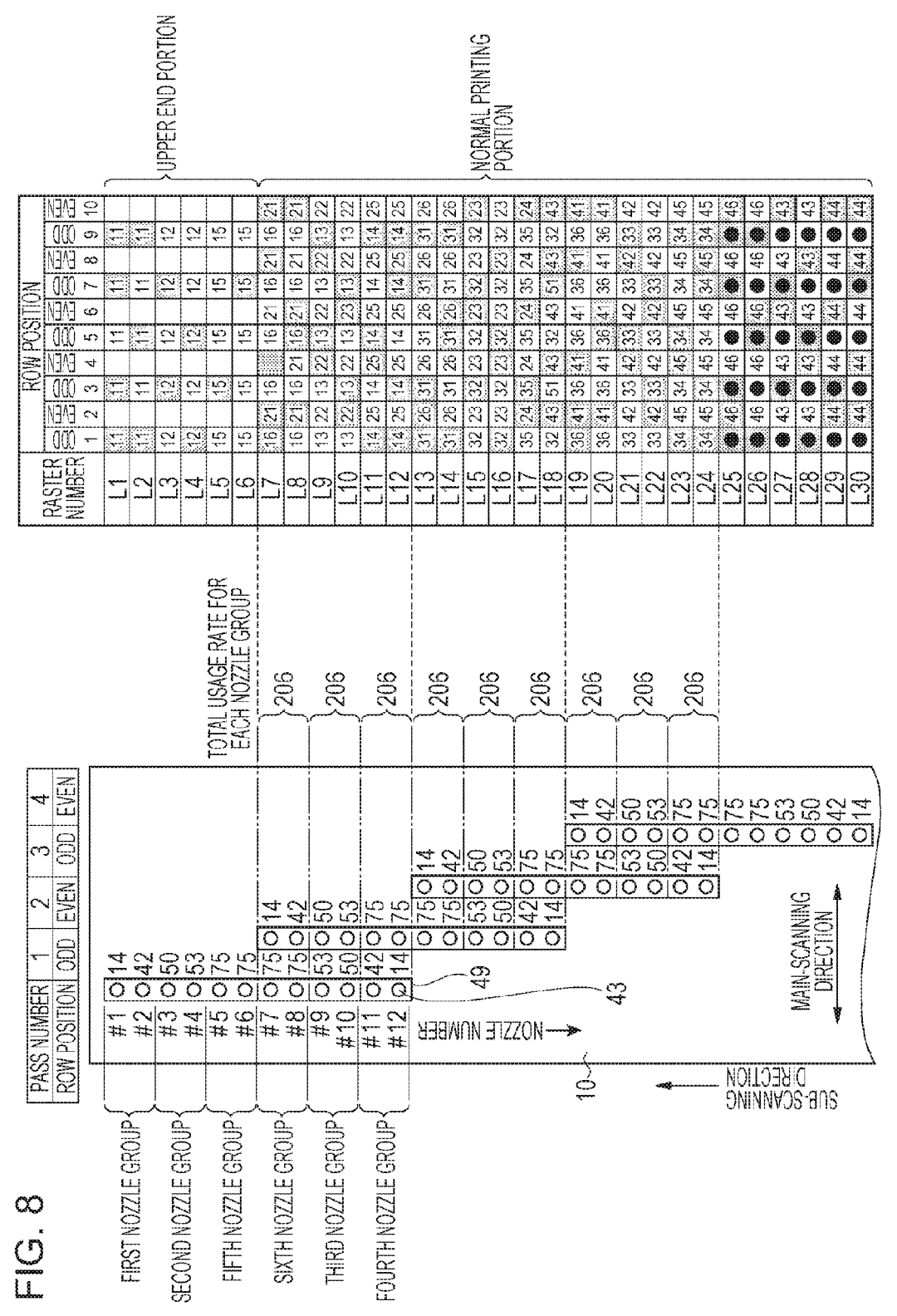

FIG. 7A is a view illustrating a mask pattern according to the second embodiment and FIG. 7B is a view illustrating nozzle usage rates in the second embodiment. FIG. 8 is a view for explaining raster lines that are formed in the second embodiment.

The liquid droplet discharge apparatus in the second embodiment will be described with reference to these drawings. The same reference numerals denote the same constituent elements as those in the first embodiment and overlapped description thereof is omitted.

FIG. 7A is a view illustrating the nozzle row 49 and a mask pattern 96 formed by patterning nozzle usage rates of the nozzles 43 of nozzle numbers #1 to #n, which are formed in the nozzle row 49. Although description has been made while the number of nozzles formed in the head 41 is n=180, in the following description, one nozzle row 49 formed by n=12 nozzles (a nozzle #1 to a nozzle #12) is assumed to be provided in the head 41 and printing is assumed to be performed with one color ink only in order to simplify the explanation.

The nozzle usage rates as illustrated in FIGS. 7A and 7B indicate rates of dots that are formed by one pass. The second embodiment employs a printing method in which printing is performed on pixels of odd rows and even rows by different passes as in the first embodiment. The maximum number of dots capable of being formed by one pass is half the number of all pixels forming raster lines and is set to the maximum nozzle usage rate of 100% with one pass. The mask pattern 96 forms a substantially isosceles trapezoid and includes three regions that are divided by lines intersecting with an upper base at both the ends and a lower base at positions opposing both the ends of the upper base. In the respective regions, average nozzle usage rates of the regions are noted. The mask pattern 96 in the second embodiment has inflection points on legs of the trapezoid.

FIG. 7B illustrates the nozzle usage rates that are assigned to the respective nozzles based on the mask pattern as illustrated in FIG. 7A when the number of nozzles is n=12. In the same manner as the first embodiment, the nozzle row 49 is divided into three regions of a first region, a second region, and a third region and they correspond to the three regions of the above-described mask pattern 96. In the second embodiment, the first region is further classified into a first nozzle group and a second nozzle group, the second region is further classified into a third nozzle group and a fourth nozzle group, and the third region is further classified into a fifth nozzle group and a sixth nozzle group. Accordingly, the nozzles 43 are provided in the head 41 in order of the first nozzle group, the second nozzle group, the fifth nozzle group, the sixth nozzle group, the third nozzle group, and the fourth nozzle group. The average nozzle usage rates of the nozzles 43 belonging to the first region and the second region are 40% and the average nozzle usage rate of the nozzles 43 belonging to the third region is 75%. In the second embodiment, dots are not formed on all the pixels forming an image by lowering the average nozzle usage rate of the nozzles 43 belonging to the third region. With this, 2-pass printing is performed by handling the nozzles 43 in all the regions as the POL nozzles.

In the second embodiment, one raster line is printed by two passes. FIG. 8 is a view for explaining raster lines that are formed in the second embodiment. The left view of FIG. 8 illustrates relative positions of the paper 10 and the nozzle row 49 in the sub-scanning direction when a pass (the discharge process and the movement process) of moving the head 41 in the main-scanning direction while causing the head 41 to discharge the ink through the nozzles (the nozzle #1 to the nozzle #12) and transportation (the transportation process) of feeding the paper 10 in the sub-scanning direction by a constant amount (in the second embodiment, an amount for six nozzles) by the transportation unit 20 are repeated four times from the upper end of the paper 10. That is to say, although FIG. 8 illustrates a state where the nozzle row 49 is moved relative to the paper 10, it is sufficient that a positional relation between the nozzle row 49 and the paper 10 is changed relatively. Therefore, the nozzle row 49 may be moved, the paper 10 may be moved, or both of the nozzle row 49 and the paper 10 may be moved.

In the second embodiment, the paper 10 is transported in the sub-scanning direction as an example. The nozzle row 49 on the respective passes is illustrated so as to be slantedly moved in the main-scanning direction such that positional illustrations of the nozzle row 49 on the respective passes do not overlap with one another. Therefore, the positional relation between the paper 10 and the nozzles (head 41) in the main-scanning direction does not make sense. Although the nozzle numbers of the respective nozzles and the nozzle groups are noted for only the nozzle row 49 of the pass 1 for the convenience of simple illustration, those are applied to the nozzle row of other passes in the same manner. The nozzle usage rates of the respective nozzles (nozzle #1 to #12) are noted by two-digit figures along the nozzle row 49 of the individual passes.

Next, dot formation positions in the respective passes are described. The right view of FIG. 8 illustrates pixel positions of the dots that are formed by the respective passes by raster (raster line) numbers and row positions. Odd-numbered passes (pass number: 1, 3, . . . ) form the dots at odd-numbered pixel positions noted with "odd" for the row position. Even-numbered passes (pass number: 2, 4, . . . ) form the dots at even-numbered pixel positions noted with "even" for the row position. In the existing technique, the POL nozzles in the first region and the POL nozzles in the second region are overlapped with each other at the odd row positions or the even row positions (see FIG. 10). In contrast, in the second embodiment, no nozzle in the first region and the second region is overlapped. To be specific, as illustrated in FIG. 8, the dots are formed at the odd row positions for the raster numbers L9 to L12 in the second region (the third nozzle group and the fourth nozzle group) in the pass 1. However, the dots are not formed at the odd row positions for the raster numbers L9 to L12 in the next pass 3 in which the dots are formed at the odd row positions.

Two-digit figures as described at each pixel position indicate the pass number and the nozzle group of the nozzle through which the liquid droplet has been discharged when all the dots are formed on the normal printing portion while the nozzle usage rates of the nozzles #1 to #12 are set to 100%. For example, the two-digit figures "16" indicate that the dot is formed by the nozzle belonging to the sixth nozzle group in the first pass. Hatched pixels indicate positions of dots that are thinned out (not formed) when printing is performed using the mask pattern and the nozzle usage rates in the second embodiment. It should be noted that pixel positions marked with "●" indicate dots formed in a pass 5 or a pass following the pass 5.

Next, total nozzle usage rates of the nozzle groups for forming the dots on the odd rows and the nozzle groups for forming the dots on the even rows for the respective nozzle groups will be described. Total usage rates as the total nozzle usage rates for the respective nozzle groups forming the same raster lines are illustrated on a center portion of FIG. 8. In the second embodiment, the total of the average nozzle usage rates of the second nozzle group and the third nozzle group is equal to the total of the average nozzle usage rates of the first nozzle group and the sixth nozzle group.

To be specific, the total nozzle usage rate of the third nozzle group in the pass 1, which forms the dots at the odd row positions for the raster numbers L9 and L10, and the second nozzle group in the pass 2, which forms the dots at the even row positions for the same raster numbers, is 206%. The total nozzle usage rate of the sixth nozzle group in the pass 1, which forms the dots at the odd row positions for the raster numbers L7 and L8, and the first nozzle group in the pass 2, which forms the dots at the even row positions for the same raster numbers, is also 206%. The total numbers of nozzles in the respective nozzle groups are the same. Therefore, the total of the average nozzle usage rates of the second nozzle group and the third nozzle group is equal to the total of the average nozzle usage rates of the first nozzle group and the sixth nozzle group. In the same manner, the total nozzle usage rates of the nozzle groups, which form the dots at the odd row positions and the even row positions for the same raster numbers, are also 206%. In other words, the above-described total nozzle usage rates of the nozzle groups can be made substantially equal to one another by lowering the nozzle usage rates of the nozzles belonging to the third region, which correspond to the normal nozzles used at the nozzle usage rates 100% in the existing technique, and using the mask pattern 96 with which the thinned-out portion is present on each of the raster lines. With this, an image is uniformly thinned out. Therefore, it can be made difficult to visually recognize shade unevenness.

Next, the image formation method in the second embodiment will be described.

First, the paper 10 is transported to a predetermined position in the transportation process. Then, the dots are formed on the odd rows for the raster numbers L1 to L12 in the discharge process and the movement process of the pass 1. The liquid droplets 46 are discharged through the nozzles 43 at positions at which the dots are formed actually in accordance with the mask pattern 96 specifying for each nozzle whether the discharge instruction is made valid or invalid. In this case, whether the discharge instruction is made valid or invalid is specified for each nozzle such that the thinned-out portion is present on each of the raster lines (of the raster numbers L5 to L8) which are formed by the nozzles #5 to #8 in the third region (the fifth nozzle group and the sixth nozzle group).

Subsequently, the paper 10 is transported in the sub-scanning direction by a distance corresponding to six nozzles in the transportation process. After that, the dots are formed on the even rows for the raster numbers L7 to L18 in the discharge process and the movement process of the pass 2. The liquid droplets 46 are discharged through the nozzles 43 at positions at which the dots are formed actually in accordance with the mask pattern 96 specifying for each nozzle whether the discharge instruction is made valid or invalid. In this case, whether the discharge instruction is made valid or invalid is specified for each nozzle such that the thinned-out portion is present on each of the raster lines (of the raster numbers L11 to L14) which are formed by the nozzles #5 to #8 in the third region (the fifth nozzle group and the sixth nozzle group).

Subsequently, the paper 10 is transported in the sub-scanning direction by a distance corresponding to six nozzles in the transportation process. After that, the dots are formed on the odd rows for the raster numbers L13 to L24 in the discharge process and the movement process of the pass 3. The liquid droplets 46 are discharged through the nozzles 43 at positions at which the dots are formed actually in accordance with the mask pattern 96 specifying for each nozzle whether the discharge instruction is made valid or invalid. In this case, whether the discharge instruction is made valid or invalid is specified for each nozzle such that the thinned-out portion is present on each of the raster lines (of the raster number L17 to L20) formed by the nozzles #5 to #8 in the third region (the fifth nozzle group and the sixth nozzle group). Subsequently, the transportation process, and the discharge process and the movement process are repeated in this order. With this, a normal printing portion is completed on the raster lines of the raster number L7 and the following numbers. It should be noted that the raster numbers L1 to L6 correspond to an upper end portion, and the upper end processing is separately performed on the upper end portion by minutely feeding the paper 10.

As for the dots formed as described above in the direction of the row position (sub-scanning direction), the thinned-out portion is present on the dots that are formed by the nozzles #5 to #8 in the third region (the fifth nozzle group and the sixth nozzle group). For example, the dot for the raster number L13 among the raster numbers L11 to L14 is thinned out for the row position 2 of the even number. In this description, the dot that is thinned out is approximately one dot because the number of nozzles belonging to the third region is set to 4 nozzles. However, when the number of nozzles is n=180, for example, the number of nozzles belonging to the third region is 60 nozzles and 15 dots corresponding 25% of the pixels that are formed by the nozzles belonging to the third nozzle are thinned out in the direction of the row position. With this, the liquid droplets 46 are not simultaneously discharged through all the nozzles belonging to the third region, which are aligned along the sub-scanning direction. Spaces corresponding to the thinned-out liquid droplets serve as pathways of airflow. Therefore, the obstacles with the liquid droplets, which cause generation of the turbulence at the opposite side to the direction in which the head 41 moves in the main-scanning direction, are eliminated, and the wind ripple is therefore made difficult to occur.

The ink jet printer 100 as the liquid droplet discharge apparatus in the second embodiment can realize the following effects as described above.

The ink jet printer 100 handles all the nozzles 43 in the same manner as the POL nozzles by lowering the nozzle usage rates of the nozzles 43 belonging to the third region and uses the mask pattern 96 with which the total of the average nozzle usage rates of the second nozzle group and the third nozzle group and the total of the average nozzle usage rates of the first nozzle group and the sixth nozzle group are substantially equal to each other. With this, an image in which the wind ripple is made difficult to occur and the shade unevenness is made difficult to be visually recognized can be realized by the 2-pass printing. Further, the print speed can be improved by printing an image by two passes.

This application claims priority to Japanese Patent Application No. 2015-059168 filed on Mar. 23, 2015. The entire disclosure of Japanese Patent Application No. 2015-059168 is hereby incorporated herein by reference.

What is claimed is:

1. A liquid droplet discharge apparatus comprising:
a head having a nozzle row in which nozzles capable of discharging liquid droplets onto a medium are aligned; and
a movement portion which moves the head relatively to the medium,
wherein the liquid droplet discharge apparatus discharges the liquid droplets onto the medium through the nozzles by causing the head to perform main scanning a plurality of number of times by the movement portion,
a region from a nozzle at one end to a first nozzle located at a position away from the nozzle at the one end by a first predetermined distance is set to a first region, a region from a nozzle at the other end at an opposite side to the one end to a second nozzle located at a position away from the nozzle at the other end by a second predetermined distance is set to a second region, and a region between the first region and the second region is set to a third region on the nozzle row,
a thinned-out portion is present on each of raster lines formed by nozzles in the third region,
a first average nozzle usage rate of the nozzles is greater than a second average nozzle usage rate of the nozzles,
the first average nozzle usage rate is an average nozzle usage rate of a first mode to form a raster of a number of a first path, and
the second nozzle usage rate is an average nozzle usage rate of a second mode to form a raster in an number of a second path that is greater than the number of the first path.

2. The liquid droplet discharge apparatus according to claim 1,
wherein the thinned-out portion is present on each of raster lines formed by nozzles in the first region and the second region.

3. The liquid droplet discharge apparatus according to claim 1,
wherein an average nozzle usage rate of the nozzles in the third region is equal to or higher than 70% and equal to or lower than 90%.

4. The liquid droplet discharge apparatus according to claim 1,
wherein nozzle usage rates of nozzles at both the ends of the nozzle row are equal to or lower than 1%.

5. The liquid droplet discharge apparatus according to claim 1,
wherein when the first region is classified into a first nozzle group and a second nozzle group, the second region is classified into a third nozzle group and a fourth nozzle group, and the third region is classified into a fifth nozzle group and a sixth nozzle group, nozzles are provided in the head in order of the first nozzle group, the second nozzle group, the fifth nozzle group, the sixth nozzle group, the third nozzle group, and the fourth nozzle group, and
a total of average nozzle usage rates of the second nozzle group and the third nozzle group is equal to a total of average nozzle usage rates of the first nozzle group and the sixth nozzle group.

6. A mask pattern specifying for each nozzle whether a discharge instruction is made valid or invalid to a liquid droplet discharge apparatus which comprises:
a head having a nozzle row in which nozzles capable of discharging liquid droplets onto a medium are aligned; and
a movement portion which moves the head relatively to the medium,
wherein the liquid droplet discharge apparatus discharges the liquid droplets onto the medium through the nozzles by causing the head to perform main scanning a plurality of number of times by the movement portion, a region from a nozzle at one end to a first nozzle located at a position away from the nozzle at the one end by a first predetermined distance is set to a first region, a region from a nozzle at the other end at an opposite side to the one end to a second nozzle located at a position away from the nozzle at the other end by a second predetermined distance is set to a second region, and a region between the first region and the second region is set to a third region on the nozzle row, the mask pattern specifies for each nozzle whether the discharge instruction is made valid or invalid such that a thinned-out portion is present on each of raster lines which are formed by nozzles in the third region, a first average nozzle usage rate of the nozzles is greater than a second average nozzle usage rate of the nozzles, the first average nozzle usage rate is an average nozzle usage rate of a first mode to form a raster of a number of a first path, and the second nozzle usage rate is an average nozzle usage rate of a second mode to form a raster in an number of a second path that is greater than the number of the first path.

7. A liquid droplet discharge method comprising:

discharging liquid droplets by a head having a nozzle row in which nozzles capable of discharging the liquid droplets onto a medium are aligned, and moving the head relatively to the medium, wherein the discharging the liquid droplets onto the medium through the nozzles occurs by causing the head to perform main scanning a plurality of number of times in the moving of the head relatively to the medium, a region from a nozzle at one end to a first nozzle located at a position away from the nozzle at the one end by a first predetermined distance is set to a first region, a region from a nozzle at the other end at an opposite side to the one end to a second nozzle located at a position away from the nozzle at the other end by a second predetermined distance is set to a second region, and a region between the first region and the second region is set to a third region on the nozzle row, the liquid droplets are discharged such that a thinned-out portion is present on each of raster lines which are formed by nozzles in the third region, a first average nozzle usage rate of the nozzles is greater than a second average nozzle usage rate of the nozzles, the first average nozzle usage rate is an average nozzle usage rate of a first mode to form a raster of a number of a first path, and the second nozzle usage rate is an average nozzle usage rate of a second mode to form a raster in an number of a second path that is greater than the number of the first path.

* * * * *